United States Patent
Yuno et al.

(10) Patent No.: US 8,877,308 B2
(45) Date of Patent: Nov. 4, 2014

(54) EASILY OPENED MULTILAYER LAMINATED PACKAGE

(75) Inventors: Masato Yuno, Tokyo (JP); Koichi Mikami, Tokyo (JP); Shin Yamada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 167 days.

(21) Appl. No.: 13/255,631

(22) PCT Filed: Mar. 8, 2010

(86) PCT No.: PCT/JP2010/053764
§ 371 (c)(1),
(2), (4) Date: Sep. 9, 2011

(87) PCT Pub. No.: WO2010/104026
PCT Pub. Date: Sep. 16, 2010

(65) Prior Publication Data
US 2012/0003412 A1 Jan. 5, 2012

(30) Foreign Application Priority Data
Mar. 13, 2009 (JP) ................................ 2009-060359

(51) Int. Cl.
*B32B 1/08* (2006.01)
*B32B 27/36* (2006.01)
*B32B 27/32* (2006.01)
*B32B 15/085* (2006.01)

(52) U.S. Cl.
CPC ......... *B32B 15/085* (2013.01); *B32B 2307/308* (2013.01); *B32B 2274/00* (2013.01);
(Continued)

(58) Field of Classification Search
CPC  B32B 27/32; B32B 2255/10; B32B 2270/00; B32B 2307/31; B32B 2307/516; B32B 2307/582
USPC ........................................ 428/34.1, 35.7, 35.2
See application file for complete search history.

(56) References Cited

U.S. PATENT DOCUMENTS

| | | | |
|---|---|---|---|
| 5,093,189 A | 3/1992 | Yamawaki | |
| 5,169,696 A | 12/1992 | Lang et al. | |
| 6,060,137 A * | 5/2000 | Akao | 428/35.2 |

FOREIGN PATENT DOCUMENTS

| | | |
|---|---|---|
| EP | 0 323 629 | 7/1989 |
| JP | 7-237281 | 9/1995 |

(Continued)

OTHER PUBLICATIONS

Giles, Harold F. Jr.; Wagner, John R. Jr.; Mount, Eldridge, M. III (2005). Extrusion—The Definitive Processing Guide and Handbook . . . William Andrew Publishing/Plastics Design Library. Online version available at: http://www.knovel.com/web/portal/browse/display?_EXT_KNOVEL_DISPLAY_bookid=1176&VerticalID=0.*

(Continued)

*Primary Examiner* — Gwendolyn Blackwell
*Assistant Examiner* — Susan R Dye
(74) *Attorney, Agent, or Firm* — Wenderoth, Lind & Ponack, LLP

(57) ABSTRACT

There is provided an easily opened multilayer laminated package suitable for the field of flexible packaging, which has easy cuttability, heat resistance, high seal strength and drop impact resistance.

A package to be used as a multilayer package, comprising a multilayer laminate body composed of a base layer and a sealant layer, wherein the value of the tear strength measured according to JIS K7128-2, when substituted into the formula (TD value)/(MD value), is such that (TD value)/(MD value)=1.5 or greater, and the value of the tear strength of the film used in the sealant layer is such that (TD value)/(MD value)=3 or greater.

14 Claims, 1 Drawing Sheet

(52) U.S. Cl.
CPC ........... *B32B 2250/242* (2013.01); *B32B 27/36* (2013.01); *B32B 2307/306* (2013.01); *B32B 2270/00* (2013.01); *B32B 2307/516* (2013.01); *B32B 2439/70* (2013.01); *B32B 2307/7246* (2013.01); *B32B 2255/10* (2013.01); *B32B 2255/26* (2013.01); *B32B 2307/31* (2013.01); *B32B 2307/7244* (2013.01); *B32B 27/32* (2013.01); *B32B 2307/582* (2013.01); *B32B 2255/06* (2013.01)
USPC ....................................................... 428/35.7

(56) References Cited

FOREIGN PATENT DOCUMENTS

| | | | | |
|---|---|---|---|---|
| JP | 2000-6993 | | | 1/2000 |
| JP | 2000-335655 | | | 12/2000 |
| JP | 2002-193319 | | | 7/2002 |
| JP | 2003-105162 | | | 4/2003 |
| JP | 2003-145698 | | | 5/2003 |
| JP | 2003145698 | | * | 5/2003 |
| JP | 2003145698 A | | * | 5/2003 |
| JP | 2003-170541 | | | 6/2003 |
| JP | 2003276134 A | | * | 9/2003 |
| JP | 2005-186492 | | | 7/2005 |
| JP | 2008-238532 | | | 10/2008 |

OTHER PUBLICATIONS

Giles, Harold F. Jr.; Wagner, John R. Jr.; Mount, Eldridge, M. III (2005). Extrusion—The Definitive Processing Guide and Handbook . . . William Andrew Publishing/Plastics Design Library. (http://www.knovel.com/web/portal/basic_search/display?_EXT_KNOVEL_DISPLAY_bookid= 1176&_EXT_KNOVEL_DISPLAY_fromSearch=true&_EXT_KNOVEL_DISPLAY_Page=1 &_EXT_KNOVEL_DI).*

Yam, Kit L. (2009). Wiley Encyclopedia of Packaging Technology (3rd Edition). John Wiley & Sons. (http://app.knovel.com/hotlink/toc/id:kpWEPTE002/wiley-encyclopedia-packaging).*

Supplementary European Search Report issued May 7, 2012 in corresponding European Application No. EP 10 75 0779.

International Search Report issued Jun. 1, 2010 in International (PCT) Application No. PCT/JP2010/053764.

International Preliminary Report on Patentability issued Oct. 27, 2011 in International (PCT) Application No. PCT/JP2010/053764.

* cited by examiner

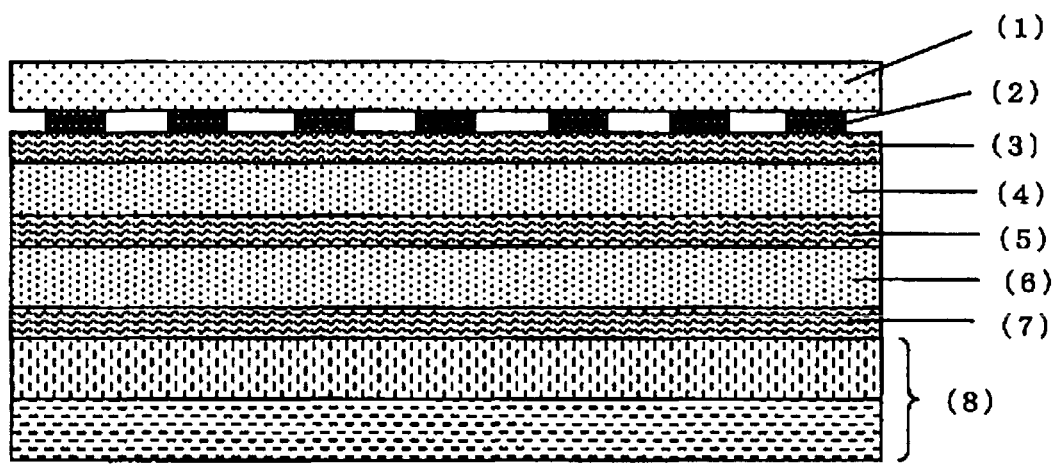

EASILY OPENED MULTILAYER LAMINATED PACKAGE

TECHNICAL FIELD

The present invention relates to an easily opened multilayer laminated package suitable for the field of flexible packaging, which has easy cuttability, heat resistance, high seal strength and drop impact resistance.

BACKGROUND ART

Packages suitable for sterilization by heat treatment have been widely used in the field of flexible packages. Such packages are mainly used for packaging of retort foods, and they are popular because of their excellent convenience.

The contents of packages are usually removed by cutting a notched section of the package with the hand. However, when they have insufficient ease of cuttability or poor straight cuttability, the cutting path tends to veer toward the contents, or conversely the opening may be too small, making it impossible to remove the contents. In such cases, continued forced cutting by hand can cause the contents to spill or can result in the contents adhering to the hands or clothing. In cases of poor packaging cuttability, therefore, it has been necessary to using a tool such as a cutter or scissors to remove the contents, thereby resulting in reduced convenience.

Much research and development, such as described below, has been carried out in order to solve this problem.

Patent document 1 discloses a standing package wherein the contents are filled into a bag-like container comprising a barrel member and a bottom member formed of a laminated film, and the opening is heat sealed, wherein the barrel member is a laminated film comprising a biaxially stretched nylon film as the outermost layer, a uniaxially stretched polyolefin film or rolled polyolefin film as the interlayer and a film comprising a mixture of ethylene-vinyl acetate copolymer with linear low-density polyethylene as the seal layer.

Also, Patent document 2 discloses an easily openable independent package provided with a laminated package body comprising (a) a film composed mainly of L-LDPE, (b) a raw film composed mainly of Ny6, biaxially stretched to a factor of at least 2.8 in both the MD direction and the TD direction and (c) a biaxially stretched PET film, wherein the (a) film is a sealant layer, the (b) film is an interlayer and the (c) film is the outermost layer, and a tearing guide resin film, having a crystalline region with directional orientation, is laminated along the tearing section of the package body, a tearing notch being formed continuously across the tearing guide resin film and the package body.

Furthermore, Patent document 3 discloses a package for sealed packaging of moisture-containing foods, wherein a food package designed for high productivity as a food package, that can be utilized for heating or cooking while applying suitably safe internal pressure with a microwave oven or the like when the contents are to be used, is formed into a standing package form using a laminated film composed mainly of plastic, having a construction wherein, for example, the edge of one side is heat sealed with an air outlet path-forming seal solution so that an air outlet path with a bent structure that is sealed at the tip section is provided, and at the opening location at the tip section of the air outlet path there are provided a cutting line and a notch at its end, while at the top edge of the bag there are provided a cutting line on the opening for removal of the contents and a notch at its end.

However, even with these technologies it has not been possible to obtain high heat resistance and easy cuttability together with high seal strength and drop impact resistance.

CITATION LIST

Patent Literature

[Patent document 1] Japanese Unexamined Patent Application Publication HEI No. 7-237281
[Patent document 2] Japanese Unexamined Patent Application Publication No. 2000-6993
[Patent document 3] Japanese Unexamined Patent Application Publication No. 2000-335655

SUMMARY OF INVENTION

Technical Problem

The present invention can provide a package with excellent cutting ease, straight cuttability and heat resistance, as well as high seal strength and drop impact resistance, that have been conventional goals in flexible packaging fields that are concerned mainly with foods, chemical products and the like. By imparting easy cuttability and straight cuttability to packages, it is possible to allow easier and cleaner cutting when the contents are removed, for smoother removal of the contents. Furthermore, since the package is heat-resistant, it can be used for boiling sterilization or retort sterilization of the contents.

Solution to Problem

The present applicant has completed this invention having the construction described below after much diligent investigation and research and development with the aim of solving the aforementioned problems. The construction of the invention, described below, exhibits a notable effect for this purpose.

A. Construction of the Invention (1) A package to be used as a multilayer package, comprising a multilayer laminate body composed of a base layer and a sealant layer, wherein the value of the tear strength measured according to JIS K 7128-2, when substituted into the formula (TD value)/(MD value), is such that (TD value)/(MD value)=1.5-15, and the value of the tear strength of the film used in the sealant layer is such that (TD value)/(MD value) =3-15.

The numerical range for the tear strength of the multilayer laminate body composed of the base layer and sealant layer is such that (TD value)/(MD value)=1.5-10, and preferably 2-10. The value of the tear strength of the film used in the sealant layer is such that (TD value)/(MD value)=3-10.

If the lower limit is less than 1.5 it will not be possible to obtain straight cuttability, and the cut pathway may be biased toward the TD during cutting. If it is 10 or greater, the drop impact strength will be notably reduced, resulting in a lack of practical usefulness as a bag.

(2) A package comprising a film in which the resin forming the sealant layer is a polypropylene-based resin, and which is stretched by uniaxial stretching to a factor in the range of 1.25-5.

(3) A package wherein the resin forming the sealant layer is an ethylene-propylene block copolymer or ethylene-propylene random copolymer.

(4) A package wherein the resin forming the sealant layer contains at least one type of ethylene-propylene rubber, ethylene-butene copolymer, ethylene-propylene copolymer, polyethylene with a density of no greater than 0.91, linear low-density polyethylene or a styrene-ethylene-based elastomer, in a range of 5-40 wt %.

(5) A package wherein the sealant layer comprises a laminate layer, an interlayer and a seal layer.

(6) A package wherein the resin forming the laminate layer is an ethylene-propylene block copolymer.

(7) A package wherein the thickness of the sealant layer is in the range of 30-130 μm.

(8) A package wherein the film forming the sealant layer is a film formed by cast film formation or inflation film formation, and the package is a polypropylene-based resin laminated body having at least two such layers.

(9) A package wherein at least one base layer is laminated on the sealant layer.

(10) A package wherein the thickness of each laminated base layer is in the range of 5-25 μm.

(11) A package wherein the oxygen permeability is no greater than 2.0 cc/m$^2$·day·atm as the numerical value obtained by the method according to JIS K 7126, and the water vapor permeability is no greater than 3.0 g/m$^2$·day as the numerical value obtained by the method according to JIS K 7129.

(12) A package wherein the multilayer laminate body is sealed with a heat seal or impulse sealing to produce a bag.

The construction of the invention will now be explained in greater detail.

B. Detailed Explanation of Construction of the Invention (1) Construction of Laminated Body Layers As a result of much diligent research, the present inventors have found that it is suitable for the multilayer laminate body used in the package of the invention to have a construction of at least base layer/sealant layer, and preferably base layer a/base layer b/sealant layer or base layer a/base layer b/base layer c/sealant layer.

More preferably, the sealant layer comprises a laminate layer, an interlayer and a seal layer (for example, an innermost layer). The sealant layer is formed by inflation film formation or cast film formation, using a polypropylene-based resin.

(2) Base Layer

The material used for the base layer may be a polyester film, polycarbonate film, nylon film, aluminum foil, silica vapor deposition film, aluminum vapor deposition film, ethylene-vinyl alcohol copolymer film or acryl-coated film.

By combining these films as laminates it is possible to impart an oxygen/water vapor barrier property and light-shielding property to the package, to prevent oxidative degradation or photodegradation of the contents.

The thickness of each base layer may be selected within a range of 5-25 μm, because if it is less than 5 μm, the values of the physical properties required for the base layer will be reduced, leading to lower physical strength of the package, while the strength including falling strength and piercing strength will be below practical levels, which is undesirable from the viewpoint of protecting the contents. If it is greater than 25 μm, the function as a package will be sufficient, but the cost of the package will be increased, resulting in an increased economical burden on the consumer.

(3) Sealant Layer

The sealant layer employs a laminated body composed mainly of a polypropylene-based material, i.e. a polypropylene-based resin, for the purpose of imparting heat resistance to the package. The sealant layer comprising such a laminated body preferably includes a laminate layer, interlayer and seal layer (innermost layer).

Stretching treatment, such as uniaxial stretching, of the polypropylene-based laminated body will cause orientation of the polypropylene main chain in a fixed direction. As a result, the polypropylene laminated body will be provided with functions such as easy cuttability and straight cuttability in the direction of orientation. A multilayer laminate body employing a stretched laminated body as the sealant layer has excellent easy cuttability and straight cuttability, and can therefore solve the problems associated with conventional packages.

Specific polypropylene resins for the polypropylene film used as the sealant layer include ethylene-propylene block copolymers and ethylene-propylene random copolymers. Particularly preferred resins are films based on ethylene-propylene block copolymers with high melting points.

Polypropylene alone has hardness and weak drop impact strength, but ethylene-propylene block copolymers are materials that circumvent the drawbacks of polypropylene alone by copolymerization of ethylene at about a few wt % with polypropylene.

Ethylene-propylene random copolymers have low melting points of about 140° C., and therefore in most cases they are not used very often as sealant layers for retort packaging, whereas block copolymers having melting points of about 160° C. can be used as retort materials.

Films of polypropylene alone have notably reduced drop impact strength in atmospheres of 5° C. and below. Thus, when packages filled with contents are accidentally dropped in such atmospheres, the risk of rupturing the package is increased. Package rupture results in leakage of contents, making it impossible to achieve the object of protecting the contents. The sealant layer is therefore preferably composed of a laminate layer, an interlayer and a seal layer.

(a) Seal Layer

The seal layer is usually the innermost layer, but it is preferred to use, for example, an ethylene-propylene block copolymer with a few ethylene portions so that high seal strength can be obtained.

When the ethylene polymerization rate of the ethylene-propylene block copolymer is high, it is not possible to obtain sufficient seal strength at those locations where the ethylene and polypropylene portions have been sealed. On the other hand, when the ethylene polymerization rate is low in an ethylene-propylene block copolymer, the low ethylene portions increase the proportion of sealing area when the surfaces are sealed, resulting in high seal strength.

(b) Interlayer

The interlayer preferably contains an added rubber component to improve the drop impact strength of the polypropylene film. The rubber component may be selected from among ethylene-propylene rubber and styrene-ethylene elastomers. Addition of one or more of these can improve the drop impact strength.

These resins may be added to the polypropylene resin in the range of 5-40 wt %. Addition at greater than 40 wt % will notably increase the drop impact strength, but the excess rubber component will prevent easy cuttability and straight cuttability from being obtained after stretching treatment. If the amount of these resins added to the polypropylene resin is below 5 wt %, it will not be possible to obtain sufficient drop impact strength.

Because rubber components have melting points in the range of 80-100° C., excess addition thereof will notably lower the heat resistance, making heat sterilization treatment impossible.

Specifically, a rubber component is added to the interlayer in a range that yields sufficient drop impact strength. When an ethylene-propylene block copolymer alone is used as the sealant layer, the drop impact strength is inferior. Also, risk of rupture is increased when the package filled with contents is dropped due to its weak drop impact strength.

The present inventors, attempting to impart drop impact strength, found that addition of a rubber component (such as ethylene-propylene rubber) to the interlayer increases the drop impact strength.

Also, excess addition of a rubber component lowers the interlayer strength between the seal layer and interlayer. Reduced interlayer strength results in low seal strength.

Specifically, when a large amount of rubber component is added, the interlayer separation is weakened and the seal strength is low, and when a small amount of rubber component is added, the interlayer separation is strengthened and the seal strength is high. Therefore, when a suitable amount of rubber component has been added to the interlayer, the interlayer strength between the seal layer and interlayer is maintained and high seal strength is obtained. From these considerations, the amount of rubber component addition is preferably 5-40 wt %, and more preferably 10-30 wt %.

When a rubber component has been added to the interlayer, the interlayer strength between the seal layer and interlayer is reduced, but a rubber component may also be added to the seal layer as a method of limiting the reduction in interlayer strength. This increases the proportion of sealing between the rubber component in the seal layer and the rubber component in the interlayer, thereby increasing the interlayer strength. A rubber component is added to the seal layer for such maintenance of the interlayer strength, but a large amount of addition to the seal layer tends to promote seal layer/interlayer interlayer separation, and therefore attention must be given to the amount of addition.

(c) Laminate Layer

The laminate layer uses a block copolymer.

Also, when a large amount of rubber component is included in the laminate layer, fats and oils penetrate into the rubber during retort cooking, creating irregularities in the sealant surface. By reducing the amount of rubber component added, the outer appearance after retort cooking is also more attractive.

Advantageous Effects of Invention

The present invention can provide a package with excellent cutting ease, straight cuttability and heat resistance, as well as high seal strength and drop impact resistance, for flexible packaging fields that are concerned mainly with foods, chemical products and the like.

By imparting easy cuttability and straight cuttability to packages when the contents are to be removed, it is possible to allow easier and cleaner cutting, for smoother removal of the contents. In addition, since the package is heat-resistant, it can be used for boiling sterilization or retort sterilization of the contents, and is thus applicable for a wide variety of uses.

BRIEF DESCRIPTION OF THE DRAWINGS

FIG. 1 shows an example of a multilayer laminate body used in a multilayer package of the invention.

DESCRIPTION OF EMBODIMENTS

Working examples of the invention, including a film and a method for production of a package according to the invention, will now be described.

The film used in the package of the invention may be a laminated film composed mainly of plastic, but it is not particularly restricted and may be, for example, any known laminated film used in various liquid packages. Any of these may be freely selected for use, as suited for the conditions of use including the type of contents to be packaged and potential heat treatment after filling.

The following are typical examples of constructions for the laminated film.

(1) ON film/adhesive/sealant layer
(2) ON film/adhesive/uniaxially stretched or biaxially stretched HDPE film/adhesive/sealant layer
(3) ON film/adhesive/uniaxially stretched or biaxially stretched PP film/adhesive/sealant layer
(4) ON film/adhesive/uniaxially stretched or biaxially stretched PP film/adhesive/aluminum foil/adhesive/sealant layer
(5) ON film (silica or alumina vapor deposition layer)/adhesive/uniaxially stretched or biaxially stretched HDPE film/adhesive/sealant layer
(6) ON film/anchor coat layer/coextruded coat layer (HDPE layer)/sealant layer
(7) ON film/anchor coat layer/coextruded coat layer (HDPE layer//LDPE layer)/adhesive/sealant layer
(8) PET film/adhesive/aluminum foil/adhesive/ON film/adhesive/sealant layer
(9) PET film/adhesive/ON film/adhesive/aluminum foil/adhesive/sealant layer
(10) PET film/adhesive/EVOH film/adhesive/ON film/adhesive/sealant layer The construction of the laminated film is not limited to these, and various combinations of laminated films may be used.

For example, depending on the conditions of use for the package, paper or synthetic paper may be laminated onto all or part of an interlayer, such as the inner side of the outermost layer of the laminated film.

Because paper or synthetic paper has a high degree of whiteness, the printing effect is increased and the design property may be improved. In the case of paper, which is more foldable, the effect of folding lines can be further increased.

In the above explanation, "ON film" is a biaxially stretched nylon film, "HDPE" is high-density polyethylene, "LDPE" is low-density polyethylene, "PP film" is a polypropylene film, "PET film" is a biaxially stretched polyethylene terephthalate film, "EVOH film" is an ethylene-vinyl acetate copolymer saponified film, and "CPP film" is an unstretched polypropylene film. The anchor coat is a pre-coating on the base film side, for improved adhesion during lamination of the resin by extrusion coating, and it is a type of primer coat.

In the construction of this laminated film, the ON film and PET film used as base films impart mechanical strength and printability to the package, while the uniaxially stretched HDPE film and uniaxially stretched PP film can stabilize the directional property of tearing, as easily openable means, by matching the stretching direction with the direction of the cutting line of the package, when the cutting line for opening of the package is fixed in the transverse direction. When the cutting line is in the oblique direction or in multiple directions including horizontal and vertical, it is preferred to use a biaxially stretched HDPE film or a biaxially stretched PP film as a strength- and moisture permeability-improving top layer.

Also, aluminum foil, silica, or an alumina vapor deposition layer or EVOH film is layered to impart a gas barrier property.

There are no particular restrictions on the form of the body of the package of the invention that is produced using a laminated film as described above, and for example, it may be produced as a package with a three-way seal form or a four-way seal form, or having a standing package base.

That is, a bag making machine suited for the form of the package to be employed may be utilized, to change the seal pattern which heat seals the side sections into a seal pattern wherein the top is heat sealed into a neck shape, while a trimming apparatus may also be added, and easily openable means such as a notch or a half-cut line, a processing apparatus for processing of an additional structural section such as a folding line on the package, i.e. a punching apparatus, a laser light irradiator, an embossing apparatus, or a hot molding apparatus including pressure/vacuum auxiliary means, may be incorporated inline, or separately prepared offline, to easily produce a package.

FIG. 1 shows an example of a multilayer laminate body used in a multilayer package. The resin used in the base layer A is preferably a polyester-based film, which has excellent heat resistance and water resistance. Also preferred are vapor deposition polyester films or barrier coat polyester films having oxygen/water vapor barrier properties.

Also, any desired printing may be carried out on the laminate layer side of the base layer A situated on the outermost layer. Printing can increase the design property of the package or can allow notification to the consumer for handling of the contents.

The base layer B may be a nylon film, or an aluminum foil that exhibits excellent oxygen/water vapor/light barrier properties, in order to impart impact resistance. Because the impact resistance of the multilayer laminate body may be reduced when an aluminum foil is used as the barrier layer, a base layer C may be added in this case, or a nylon film or the like laminated to improve the physical strength of the package.

The laminate layer is formed using a dry laminate method, in which the adhesive used is a two-pack curable urethane-based adhesive (base compound: polyester polyol, curing agent: aromatic isocyanate or aliphatic isocyanate) or a two-pack curable epoxy-based adhesive, having excellent heat resistance and also a clean outer appearance after lamination. By using such adhesives, it is possible to maintain a clean outer appearance after heat treatment, without delamination between the base layers or between the base layer/sealant layer, even when heat sterilization treatment has been performed.

The oxygen permeability was measured using an OXT-RAN 2/20, product of MOCON, U.S.A., under conditions with a temperature of 23° C. and a humidity of 90% RH. The water vapor permeability was measured using a PERMATRAN, product of MOCON, U.S.A., under conditions with a temperature of 40° C. and a humidity of 90% RH.

EXAMPLES

Example 1

(1) Sealant Layer Laminated Body

As the seal layer, 10 parts by weight of a propylene-ethylene copolymer (MFR: 7.0, melting point: 75° C.) was prepared with 90 parts by weight of an ethylene-propylene block copolymer (density: 0.90, MFR: 0.5, melting point: 164° C.).

For the interlayer, 10 parts by weight of ethylene-propylene rubber (MFR: 0.6) was prepared with 90 parts by weight of an ethylene-propylene block copolymer (density: 0.90, MFR: 0.7, melting point: 161° C.).

For the laminate layer, 100 parts by weight of an ethylene-propylene block copolymer (density: 0.90, MFR: 0.5, melting point: 164° C.) was prepared.

A laminated body having a total thickness of 140 μm was produced from a 40 μm resin composition layer as the seal layer, a 70 μm resin composition layer as the interlayer, and a 30 μm resin composition layer as the laminate layer, using a top-blown air-cooled inflation co-extrusion film-forming machine.

The laminated body was subjected to stretching treatment to a factor of 2.0 with an uniaxial stretching machine, to a thickness of 50 μm for the sealant layer laminated body, and the laminate layer was subjected to corona treatment.

As a result of measurement, the tear strength of the sealant layer laminated body (TD value)/(MD value) was 6.2.

(2) Multilayer Laminate Body

A two-pack curable urethane adhesive (base compound: polyester polyol, curing agent: aromatic isocyanate) was coated onto the laminate layer of the sealant layer laminated body, and an 8 μm aluminium foil was laminated thereover. The aluminum foil surface of the laminated body was also coated with a two-pack curable urethane adhesive, and a 12 μm PET film was laminated thereover. (PET12/adhesive/AL8/adhesive/sealant layer laminated body 70)

The produced multilayer laminate body was heat sealed from a flat seal under conditions with a seal temperature of 230° C., 1 kg/cm$^2$, 1 second and a seal width of 10 mm, to produce a package with a length of 170 mm and a width of 130 mm. After pouring 200 cc of water into the produced package, the opening was heat sealed in the same manner under the same conditions. The heat sealed package was subjected to retort treatment at 120° C. for 30 minutes, and upon confirming the outer appearance, no leakage of contents or detachment of the adhesive layer was found. When the package was cut by hand in the stretching direction, straight cuttability was accomplished and the cut outer appearance of the package was clean.

As a result of measurement, the tear strength of the multilayer laminate body was 0.40N as MD and 0.72N as TD, and therefore (TD value)/(MD value) was 1.8.

The oxygen permeability was 0 cc/m$^2$/day/atm, and the water vapor permeability was 0 g/m$^2$/day.

Example 2

(1) Sealant Layer Laminated Body

For the seal layer, 10 parts by weight of ethylene-propylene rubber (MFR: 0.5) was prepared with 90 parts by weight of an ethylene-propylene block copolymer (density: 0.90, MFR: 0.5, melting point: 164° C.).

For the interlayer, 10 parts by weight of ethylene-α-olefin copolymer (density: 0.862, MFR: 1.2) was prepared with 90 parts by weight of an ethylene-propylene block copolymer (density: 0.90, MFR: 1.3, melting point: 163° C.).

For the laminate layer, 100 parts by weight of an ethylene-propylene block copolymer (density: 0.90, MFR: 0.5, melting point: 164° C.) was prepared.

A laminated body having a total thickness of 150 μm was produced from a 50 μm resin composition layer as the seal layer, a 80 μm resin composition layer as the interlayer, and a 20 μm resin composition layer as the laminate layer, using a top-blown air-cooled inflation co-extrusion film-forming machine.

The laminated body was subjected to stretching treatment to a factor of 3.0 with an uniaxial stretching machine, to a thickness of 50 μm for the sealant layer laminated body, and the laminate layer was subjected to corona treatment.

As a result of measurement, the tear strength of the sealant layer laminated body (TD value)/(MD value) was 7.1.

(2) Multilayer Laminate Body

A two-pack curable urethane adhesive (base compound: polyester polyol, curing agent: aliphatic isocyanate) was coated onto the laminate layer of the sealant layer laminated body, and a 7 μm aluminium foil was laminated thereover. The aluminum foil surface of the laminated body was also coated with a two-pack curable urethane adhesive, and a 15 μm biaxially stretched nylon film was laminated thereover. A 12 μm polyester film was laminated onto the nylon film side of the laminated body. (PET12/adhesive/ONy15/adhesive/AL7/adhesive/sealant layer laminated body 50)

The produced multilayer laminate body was heat sealed from a flat seal under conditions with a seal temperature of 230° C., 1 kg/cm$^2$, 1 second and a seal width of 10 mm, to produce a package with a length of 170 mm and a width of 130 mm. After pouring 200 cc of water into the produced package, the opening was heat sealed in the same manner under the same conditions. The heat sealed package was subjected to retort treatment at 120° C. for 30 minutes, and upon confirming the outer appearance, no leakage of contents or detachment of the adhesive layer was found. When the package was cut by hand in the stretching direction, straight cuttability was accomplished and the cut outer appearance of the package was clean.

As a result of measurement, the tear strength of the multilayer laminate body was 0.35N as MD and 0.84N as TD, and therefore (TD value)/(MD value) was 2.4.

The oxygen permeability was 0 cc/m$^2$/day/atm, and the water vapor permeability was 0 g/m$^2$/day.

Industrial Applicability

The present invention can provide a package with excellent cutting ease, straight cuttability and heat resistance, as well as high seal strength and drop impact resistance, for flexible packaging fields that are concerned mainly with foods, chemical products and the like, and therefore allows boiling sterilization and retort sterilization of contents and can be developed for a wide variety of uses.

REFERENCE SIGNS LIST (1) Base layer (A)
(2) Printed image
(3), (5), (7) Laminate adhesive layers
(4) Base layer (B)
(6) Base layer (C)
(8) Sealant layer

The invention claimed is:

1. A package for boil sterilization or retort sterilization to be used as a multilayer package, comprising a multilayer laminate body having a base layer and a sealant layer,
    wherein the value of the tear strength of the multilayer laminate body measured according to JIS K7128-2 is such that (TD value)/(MD value)=1.5-10, and
    wherein the value of the tear strength of the film used in the sealant layer is such that (TD value)/(MD value)=3-10, and
    wherein the sealant layer is formed of an ethylene-propylene block copolymer-based resin which comprises a laminate layer, an interlayer, and a seal layer,
    wherein the resin film is stretched by uniaxial stretching to a factor in the range of 1.25-5, and
    wherein the interlayer consists of a blend of 60-95 wt % of ethylene-propylene block copolymer and 5-40 wt % of at least one rubber component selected from an ethylene-propylene rubber and a styrene-ethylene-based elastomer.

2. The package of claim 1, wherein the thickness of the sealant layer is in the range of 30-130 μm.

3. The package of claim 1, wherein the sealant layer is a film formed by cast film formation or inflation film formation.

4. The package of claim 1, wherein at least one base layer is laminated on the sealant layer.

5. The package of claim 1, wherein the thickness of each laminated base layer is in the range of 5-25 μm.

6. The package of claim 1, wherein the oxygen permeability is no greater than 2.0 cc/m$^2$·day·atm as the numerical value obtained by the method according to JIS K 7126, and the water vapor permeability is no greater than 3.0 g/m$^2$·day as the numerical value obtained by the method according to JIS K 7129.

7. The package of claim 1, wherein the multilayer laminate body is sealed with a heat seal or impulse sealing in the form of a bag.

8. A package for boil sterilization or retort sterilization to be used as a multilayer package, comprising a multilayer laminate body having a base layer and a sealant layer,
    wherein the value of the tear strength of the multilayer laminate body measured according to JIS K7128-2 is such that (TD value)/(MD value)=1.5-10, and
    wherein the value of the tear strength of the film used in the sealant layer is such that (TD value)/(MD value)=3-10, and
    wherein the sealant layer is formed of an ethylene-propylene block copolymer-based resin film which comprises a laminate layer, an interlayer and a seal layer,
    wherein the resin film is stretched by uniaxial stretching to a factor in the range of 1.25-5, and
    wherein the interlayer contains ethylene-propylene block copolymer and 10-30 wt % of at least one component selected from an ethylene-propylene rubber and a styrene-ethylene-based elastomer.

9. The package of claim 8, wherein the thickness of the sealant layer is in the range of 30-130 μm.

10. The package of claim 8, wherein the sealant layer is a film formed by cast film formation or inflation film formation.

11. The package of claim 8, wherein at least one base layer is laminated on the sealant layer.

12. The package of claim 8, wherein the thickness of each laminated base layer is in the range of 5-25 μm.

13. The package of claim 8, wherein the oxygen permeability is no greater than 2.0 cc/m$^2$·day·atm as the numerical value obtained by the method according to JIS K 7126, and the water vapor permeability is no greater than 3.0 g/m$^2$·day as the numerical value obtained by the method according to JIS K 7129.

14. The package of claim 8, wherein the multilayer laminate body is sealed with a heat seal or impulse sealing in the form of a bag.

* * * * *